US012573803B2

(12) United States Patent
Tao et al.

(10) Patent No.: US 12,573,803 B2
(45) Date of Patent: Mar. 10, 2026

(54) CONTROL METHOD AND OPTICAL FIBER AMPLIFIER

(71) Applicant: Accelink Technologies Co., Ltd., Wuhan (CN)

(72) Inventors: Jintao Tao, Wuhan (CN); Chengpeng Fu, Wuhan (CN); Bingmei Zeng, Wuhan (CN); Jingyang Fan, Wuhan (CN); Hao Zhang, Wuhan (CN); Lijing Cheng, Wuhan (CN); Chunping Yu, Hubei (CN); Menghui Le, Hubei (CN)

(73) Assignee: Accelink Technologies Co., Ltd., Wuhan City (CN)

( * ) Notice: Subject to any disclaimer, the term of this patent is extended or adjusted under 35 U.S.C. 154(b) by 1002 days.

(21) Appl. No.: 17/641,534

(22) PCT Filed: Dec. 5, 2019

(86) PCT No.: PCT/CN2019/123409
§ 371 (c)(1),
(2) Date: Mar. 9, 2022

(87) PCT Pub. No.: WO2021/047075
PCT Pub. Date: Mar. 18, 2021

(65) Prior Publication Data
US 2022/0385024 A1 Dec. 1, 2022

(30) Foreign Application Priority Data
Sep. 10, 2019 (CN) .......................... 201910850856.0

(51) Int. Cl.
*H01S 3/067* (2006.01)
*H01S 3/10* (2006.01)
(Continued)

(52) U.S. Cl.
CPC ...... *H01S 3/06758* (2013.01); *H01S 3/10015* (2013.01); *H01S 3/13013* (2019.08);
(Continued)

(58) Field of Classification Search
None
See application file for complete search history.

(56) References Cited

U.S. PATENT DOCUMENTS 9,300,110 B2 * 3/2016 Griseri .................. H01S 3/1001
11,165,501 B2 * 11/2021 Imanishi ............ H04B 10/2916
(Continued)

FOREIGN PATENT DOCUMENTS

CN 101911549 A 12/2010
CN 102332954 A 1/2012
(Continued)

OTHER PUBLICATIONS

The Extended EP Search Report dated Aug. 22, 2023 for EP App. No. 19944670.9.
(Continued)

*Primary Examiner* — Eric L Bolda
(74) *Attorney, Agent, or Firm* — Lei Fang, Esq.; Smith Tempel Blaha LLC

(57) ABSTRACT

Disclosed are a control method and an optical fiber amplifier. The optical fiber amplifier is configured to execute the control method. The method comprises: initially adjusting a target gain on the basis of a first offset gain to obtain the post-initial-adjustment target gain; when the actual power of the pump laser reaches target power determined on the basis of the post-initial-adjustment target gain, obtaining, on the basis of a first signal optical power and a second signal optical power, a second offset gain and a first offset slope through calculation; adjusting again the post-initial-adjust-ment target gain according to the second offset gain to obtain (Continued)

a adjusted target gain; and adjusting a target slope according to the first offset slope to obtain a adjusted target slope. This solution can provide high precision control for the gain and the slope of the optical fiber amplifier.

11 Claims, 3 Drawing Sheets

(51) Int. Cl.

| | |
|---|---|
| *H01S 3/13* | (2006.01) |
| *H01S 3/30* | (2006.01) |
| *H04B 10/291* | (2013.01) |
| *H04B 10/294* | (2013.01) |
| *H04B 10/296* | (2013.01) |

(52) U.S. Cl.
CPC ......... *H01S 3/302* (2013.01); *H04B 10/2912* (2013.01); *H04B 10/2916* (2013.01); *H04B 10/2942* (2013.01); *H04B 10/296* (2013.01); *H01S 2301/04* (2013.01)

(56) References Cited

U.S. PATENT DOCUMENTS

| | | | |
|---|---|---|---|
| 2002/0159119 | A1 | 10/2002 | Fries et al. |
| 2004/0179849 | A1 | 9/2004 | Miyazaki |
| 2005/0041977 | A1 | 2/2005 | Denkin et al. |
| 2007/0291349 | A1 | 12/2007 | Zhou et al. |
| 2011/0020010 | A1 | 1/2011 | Bruno et al. |
| 2011/0026928 | A1 | 2/2011 | Stango |
| 2016/0006206 | A1 | 1/2016 | Kim et al. |
| 2018/0358775 | A1 | 12/2018 | Miura et al. |

FOREIGN PATENT DOCUMENTS

| | | |
|---|---|---|
| CN | 103780307 A | 5/2014 |
| CN | 104993872 A | 10/2015 |
| CN | 106299992 A | 1/2017 |
| CN | 108352672 A | 7/2018 |
| CN | 108988949 A | 12/2018 |
| CN | 109980492 A | 7/2019 |
| CN | 110601766 A | 12/2019 |
| EP | 3300190 A1 | 3/2018 |

OTHER PUBLICATIONS

Chinese Search Report for Application No. 201910850856.0 dated May 26, 2020, pp. 1-3.
International Search Report for Application No. PCT/CN2019/123409 mailed May 27, 2020, 2 pages.

* cited by examiner

S101
Initially correcting a target gain on the basis of a first compensation gain to obtain an initially corrected target gain S102
Calculating a second compensation gain and a first compensation slope on the basis of first signal optical power and second signal optical power when actual power of a pump laser reaches target power determined on the basis of the initially corrected target gain, wherein the second signal optical power is signal optical power when the actual power of the pump laser reaches the target power; and the first signal optical power is signal optical power when the pump laser is turned off S103
Correcting the initially corrected target gain again according to the second compensation gain to obtain a corrected target gain; and correcting a target slope according to the first compensation slope to obtain a corrected target slope

FIG. 1

Tilt=3dB

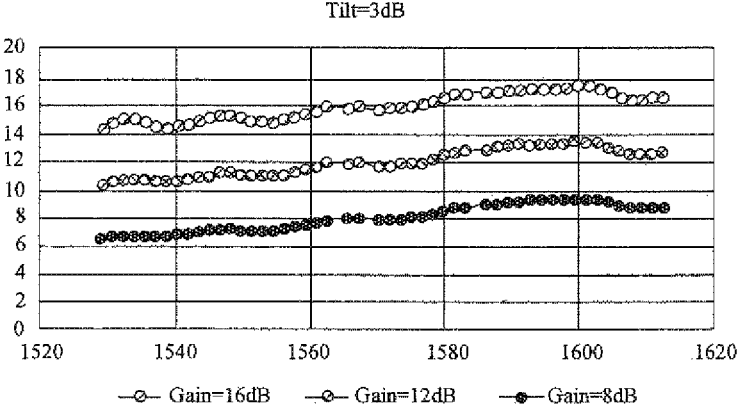

—⊙— Gain=16dB    —⊙— Gain=12dB    —●— Gain=8dB

FIG. 2a

Optical fiber amplifier

| Pump laser 32 | First photodiode 33 | Second photodiode 34 |

Controller 31

CONTROL METHOD AND OPTICAL FIBER AMPLIFIER

CROSS-REFERENCE TO RELATED APPLICATION(S)

The present application is a U.S. National phase entry under 35 U.S.C. 371 of International Application No. PCT/CN2019/123409, filed Dec. 5, 2019, which claims the benefit of, and priority to, a Chinese patent application No. 201910850856.0 filed on Sep. 10, 2019, the disclosure of these two applications are hereby incorporated by reference herein in their entirety.

TECHNICAL FIELD OF THE DISCLOSURE

The present disclosure relates to the carrier field of communication systems, and in particular to a control method and an optical fiber amplifier.

BACKGROUND

Increasing the bandwidth range of the carrier in a communication system is an effective method to increase the data capacity of the communication system. Compared with a C-band system, a C+L-band communication system can increase the system capacity to approximately 2 times in a case where the rate of a transmitter remains unchanged. In order to cooperate with the transmission of the C+L-band high-speed communication system, higher requirements are put forward for the selection of amplifier that provides relay amplification.

For the existing Raman fiber amplifier, each pump laser is controlled by a proportional relationship in the current C-band or L-band Raman control system. However, in the ultra-wideband C+L-band system, the pump wavelength distribution is much wider than that of the only C-band or L-band, and the Raman effects between the pump lasers are obvious. A large part of the energy of a short-wavelength pump laser will be transferred to a long-wavelength pump laser. As such, the proportional relationship between the pump lasers will not be linear, and the method of controlling the power of each pump laser by means of the proportion relationship is no longer applicable. In this case, the high-precision control of the gain and slope of the Raman optical fiber amplifier has encountered difficulties.

SUMMARY

In view of the above, the main purpose of embodiments of the present disclosure is to provide a control method and an optical fiber amplifier, which can provide high-precision control for the gain and slope of the optical fiber amplifier within a large adjustable range, and can accurately report the unamplified source signal power, the current gain and slope.

In order to realize the above-mentioned purpose, the technical solutions of the embodiments of the present disclosure are implemented as follows.

An embodiment of the present disclosure provides a control method comprising:

initially adjusting a target gain on the basis of a first offset gain to obtain a post-initial-adjustment target gain;

calculating a second offset gain and a first offset slope on the basis of first signal optical power and second signal optical power when actual power of a pump laser reaches target power determined on the basis of the post-initial-adjustment target gain, wherein the second signal optical power is signal optical power when the actual power of the pump laser reaches the target power, and the first signal optical power is signal optical power when the pump laser is turned off;

adjusting again the post-initial-adjustment target gain according to the second offset gain to obtain a adjusted target gain; and adjusting a target slope according to the first offset slope to obtain a adjusted target slope.

Preferably, the method further comprises:

obtaining a first actual gain and a second actual gain by means of computation on the basis of a first preset slope, a first preset gain, and a second preset gain;

calculating the first offset gain on the basis of the first actual gain, the second actual gain, the first preset gain and the second preset gain.

Preferably, the method further comprises:

calculating the target power of the pump laser on the basis of the post-initial-adjustment target gain and the target slope.

Preferably, before calculating the second offset gain and the first offset slope on the basis of the first signal optical power and the second signal optical power, the method further comprises:

obtaining gain control monitoring channel power;

calculating noise power of signal light in a main optical path based on the gain control monitoring channel power; and calculating an actual gain based on the gain control monitoring channel power.

Preferably, calculating the second offset gain and the first offset slope on the basis of the first signal optical power and the second signal optical power comprises:

calculating unamplified signal power of unamplified signal light in signal light passing through the pump laser and unamplified source signal power, on the basis of the second signal optical power, the noise power of signal light in the main optical path, and the actual gain;

calculating the second offset gain on the basis of the first signal optical power and the unamplified source signal power;

calculating the first offset slope on the basis of the second offset gain.

An embodiment of the present disclosure further provides a controller, the optical fiber amplifier comprises: a pump laser, and a first photodiode; wherein the controller is configured to initially adjust a target gain on the basis of a first offset gain to obtain a post-initial-adjustment target gain; to calculate a second offset gain and a first offset slope on the basis of first signal optical power and second signal optical power when actual power of the pump laser reaches target power determined on the basis of the post-initial-adjustment target gain; to adjust again the post-initial-adjustment target gain according to the second offset gain to obtain a adjusted target gain; and to adjust a target slope according to the first offset slope to obtain a adjusted target slope;

the pump laser is configured to adjust the actual power according to control of the controller; and the first photodiode is configured to detect the first optical signal power when the pump laser is turned off, and the second optical signal power when the actual power of the pump laser reaches the target power.

Preferably, the controller is further configured to calculate a first actual gain and a second actual gain by means of computation on the basis of a first preset slope, a first preset gain, and a second preset gain; and to calculate the first offset gain on the basis of the first actual gain, the second actual gain, the first preset gain and the second preset gain.

Preferably, the controller is further configured to calculate the target power of the pump laser on the basis of the post-initial-adjustment target gain and the target slope.

Preferably, the optical fiber amplifier further comprises:

a second photodiode, which is configured to detect gain control monitoring channel power; and the controller is further configured to receive the gain control monitoring channel power detected by the second photodiode, to calculate noise power of signal light in a main optical path based on the gain control monitoring channel power; and to calculate an actual gain based on the gain control monitoring channel power.

Preferably, the controller is further configured to calculate unamplified signal power of unamplified signal light in signal light passing through the pump laser on the basis of the second signal optical power, the noise power of signal light in the main optical path, and the actual gain, and unamplified source signal power; to calculate the second offset gain on the basis of the first signal optical power and the unamplified source signal power; and to calculate the first offset slope on the basis of the second offset gain.

In the control method and the optical fiber amplifier provided by the embodiments of the present disclosure, the post-initial-adjustment target gain is obtained by adjusting the target gain with the first offset gain; then the second offset gain and the first offset slope are calculated on the basis of the first signal optical power which is read when the pump laser is turned off and the second signal optical power which is read when the signal light is amplified by the pump laser; and the post-initial-adjustment target gain and target slope by using the second offset gain and the first offset slope, so that high-precision control can be provided for the gain and the slope of the optical fiber amplifier.

BRIEF DESCRIPTION OF THE DRAWINGS

FIG. 1 is a schematic diagram of an implementation flowchart of a control method provided by an embodiment of the present disclosure.

FIGS. 2a-2c are schematic diagrams of C+L-band signal light after being amplified by a Raman optical fiber amplifier in an embodiment of the present disclosure.

DETAILED DESCRIPTION

Figure 2B:
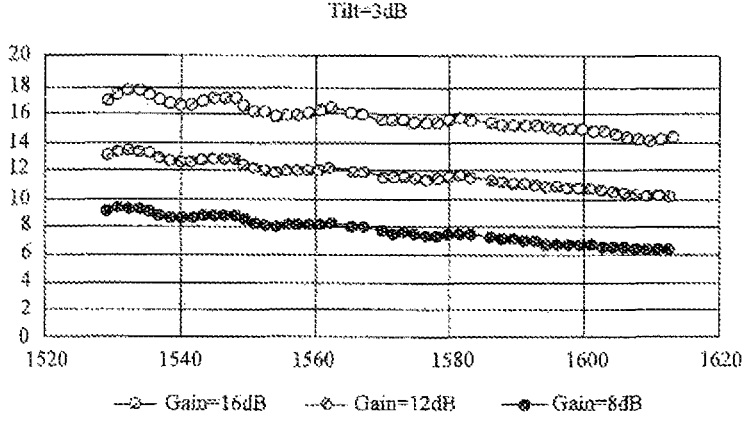

In order to make the objects, technical solutions and advantages of embodiments of the present disclosure more obvious, the technical solutions in the embodiments of the present disclosure will be clearly described below in conjunction with the accompanying drawings in the embodiments of the present disclosure. Obviously, the described embodiments are just a part of embodiments of the present disclosure, but not all embodiments.

Based on the embodiments of the present disclosure, all other embodiments obtained by those of ordinary skill in the art without inventive labor shall fall within the protection scope of the embodiments of the present disclosure.

An embodiment of the present disclosure provides a control method, which is applied to an optical fiber amplifier. FIG. 1 shows a schematic diagram of an implementation flowchart of a control method provided by the embodiment of the present disclosure. As shown in FIG. 1, the method comprises:

Step 101: initially adjusting a target gain on the basis of a first offset gain to obtain a post-initial-adjustment target gain;

Step 102: calculating a second offset gain and a first offset slope on the basis of first signal optical power and second signal optical power when actual power of a pump laser reaches target power determined on the basis of the post-initial-adjustment target gain, wherein the second signal optical power is signal optical power when the actual power of the pump laser reaches the target power; and the first signal optical power is signal optical power when the pump laser is turned off; and Step 103: adjusting again the post-initial-adjustment target gain according to the second offset gain to obtain a adjusted target gain; and adjusting a target slope according to the first offset slope to obtain a adjusted target slope.

It should be noted that the optical fiber amplifier in the embodiment of the present disclosure is a Raman optical fiber amplifier.

The optical fiber amplifier will be different due to different placement environments; for example, when the optical fiber amplifier is placed indoors and outdoors, the gain of the optical fiber amplifier is different and has deviation due to light, temperature, humidity and other reasons, and the first offset gain is a offset made for such deviation. Therefore, it is necessary to obtain the first offset gain in advance.

A first actual gain and a second actual gain are obtained by means of a computation based on a first preset slope, a first preset gain and a second preset gain; and the first offset gain is calculated on the basis of the first actual gain, the second actual gain, the first preset gain and the second preset gain.

In order to calculate the first offset gain, it is necessary to set a first preset gain $Gain_{offset\_set1}$, a second preset gain $Gain_{offset\_set2}$, and a first preset slope Tilt in a controller of the optical fiber amplifier provided in the embodiment of the present disclosure. At this time, let Tilt=0.

The first target power of each pump laser is calculated by a feedforward formula (1) on the basis of the first preset gain $Gain_{offset\_set1}$ and the first preset slope Tilt.

$$P(n)*PL=k1(n)*G^2+k2(n)*G+k3(n)*T^2+k4(n)*T+b \qquad (1)$$

where G represents a gain of an optical fiber amplifier, such as the first preset gain $Gain_{offset\_set1}$, the second preset gain $Gain_{offset\_set2}$; T represents a slope of the optical fiber amplifier, such as the first preset slope Tilt, n is a positive integer; P(n) represents the first target power of the nth pump laser; k1(n), k2(n), k3(n), and b are the calibration parameters of each pump laser, which are the values pre-written into the memory of each pump laser.

The number of the above-mentioned pump lasers may be one or more, preferably four or more, so that the flatness of gain can be met. When the number of pump lasers in the embodiment of the present disclosure is 5, the first target power of these five pump lasers can be calculated by using the above formula (1).

PL represents the connection loss of the output jumper of the amplifier module and the transmission optical fiber, or the connection loss converted from the ratio between the actual transmission fiber and the calibrated fiber; for singlemode optical fibers, it is obtained through calculation by means of PL=0.25*Distance+0.5*n, and for multi-mode optical fibers, it is obtained through calculation by means of PL=0.36*Distance+0.5*n, where the Distance represents the total number of kilometers, and n represents the number of active linkers.

Since the calibration parameters of the pump lasers are different respectively, the first target power of the pump lasers which is calculated by the above formula (1) is different respectively. In combination with FIG. 3, when N=5, the first target power of these five pump lasers is different.

After the first target power of each pump laser is calculated, the controller of the optical fiber amplifier controls the currents of these pump lasers, so that the first actual power of all the pump lasers reaches the corresponding first target power respectively, that is, the first actual power of each pump laser is equal to the first target power.

The number of the gain control monitoring channels used in the embodiment of the present disclosure is related to the wavelength bandwidth of the signal light, and if the signal light has a narrower wavelength bandwidth, then it is sufficient to use the bandwidth of one gain control monitoring channel. Exemplarily, in this embodiment of the present disclosure, considering the ultra-wide spectral range of the C+L band, the wavelength of two gain control monitoring channels are selected, wherein the monitoring signal has a wavelength other than the signal light wavelength, and the power thereof is not affected by the presence or absence of the signal light, and it is completely generated by the Raman amplification effect spontaneous radiation amplification (ASE); regarding the wavelength of two gain control monitoring channels, one is located at a short wave less than the shortest wavelength of the C-band, and the other is located at a long wave greater than the longest wavelength of the L-band.

After the first actual power of each pump laser reaches the first target power, the gain control monitoring channel power $P_{ASE(1)}$ is read through the photodiode of any one of the above two gain control monitoring channels, and is brought into Formula (2), thus the first actual gain $G_{offset(1)}$ corresponding to the gain control monitoring channel power $P_{ASE(1)}$ read above is calculated.

$$P_{ASE}=k_{ASE}1*G^2+k_{ASE}2*G+k_{ASE}3*T^2+k_{ASE}4*T+B_{ASE} \qquad (2)$$

where the parameters $k_{ASE}1$, $k_{ASE}2$, $k_{ASE}3$, $k_{ASE}4$, bASE are obtained through calibration and are written into the memory when each pump laser leaves the factory, and at this time for T, it is still Tilt=0.

The second target power of each pump laser is calculated by the feedforward formula (1) on the basis of the second preset gain $Gain_{offset\_set2}$ and the first preset slope Tilt.

Then, the controller of the optical fiber amplifier controls the current of each pump laser, so that the second actual power of these pump lasers reach the second target power, that is, the second actual power of each pump laser is equal to the second target power.

When the second actual power of each pump laser reaches the second target power, the power $P_{ASE(2)}$ of the gain control monitoring channel is read through the photodiode of any gain control monitoring channel and is brought into formula (2), thus the second actual gain $G_{offset(2)}$ at this time is calculated.

The $G_{offset}$ is calculated with formula (3), and its value at this time is the first offset gain $G_{offset}$.

$$G_{offset} = \frac{G_{offset(1)} - G_{offset(2)}}{Gain_{offset\_set1} - Gain_{offset\_set2}} * Gain_{offset\_set1} + \frac{G_{offset(1)} * Gain_{offset\_set2} - G_{offset(2)} * Gain_{offset\_set3}}{Gain_{offset\_set2} - Gain_{offset\_set1}} \qquad (3)$$

At the same time, the actual slope Tilt of the optical fiber amplifier can be calculated by formula (4) according to $P_{ASE(1)}$ and $P_{ASE(2)}$ having been read twice.

$$Tilt = \frac{P_{ASE(2)} - P_{ASE(1)}}{k_{tilt}} \qquad (4)$$

where $k_{tilt}$ is obtained through calibration.

The target gain $G_{set}$ that the customer needs to reach is adjusted by using the first offset gain $G_{offset}$, so that the post-initial-adjustment target gain is $G_{set}+G_{offset}$.

The target power of the pump laser is calculated on the basis of the post-initial-adjustment target gain and the target slope.

The target power of each pump laser is calculated by bringing the post-initial-adjustment target gain $G_{set}+G_{offset}$ and the target slope $T_{set}$ that the customer needs to reach into formula (1). At this time, the controller of the fiber amplifier controls the current of each pump laser, so that the actual power of these pump lasers reaches the target power, that is, the actual power of each pump laser is equal to the target power.

Formula (1) can be used as the feedforward formula of the embodiments of the present disclosure, and the target gain and the target slope are brought into Formula (1) to calculate the target power of each pump laser 32 which is a theoretical value and can be understood as that when the actual power of each pump laser 32 reaches this target power, the actual gain and the actual slope should be the same as the target gain and the target slope; however, due to the error caused by similar environmental reasons, after the actual power of each pump laser is controlled to reach the target power, the obtained actual gain and the obtained actual slope are different from the target gain and the target slope, but they are very close. Therefore, the function of formula (1) is to let the operator know to which value the power of each pump laser should be adjusted to make the gain at this time be closer to the target gain, which simplifies the process that the operator gradually and tentatively adjusts the power of the pump laser to reach the target gain and the target slope and has a fast and efficient effect.

The gain control monitoring channel power is obtained; the noise power of the signal light in the main optical path is calculated based on the gain control monitoring channel power; and the actual gain is calculated based on the power of the gain control monitoring channel.

When the actual power of the pump lasers is equal to the target power, the gain control monitoring channel power $P_{ASE}$ is detected through the second photodiode on any gain control monitoring channel, and is brought into Formula (2) to calculate the actual gain $G_{cal}$ at this time.

The noise power $P_{ASE\_inband}$ of the signal light in the main optical path is calculated by bringing it into formula (5):

$$P_{ASE\_inband}=k_{ASE\_inband}1*P_{ASE}^2+k_{ASE\_inband}2*P_{ASE}+b_{ASE\_inband} \qquad (5)$$

where the parameters $k_{ASE\_Inband}1$, $k_{ASE\_inband}2$, and $b_{ASE\_Inband}$ are obtained through calibration and are written into the memory when the pump laser leaves the factory.

Due to the spontaneous radiation amplification of the Raman amplification effect, after the signal light is amplified by the Raman fiber amplifier, a noise signal will be generated in the main optical path, namely $P_{ASE\_Inband}$, and Formula (5) can calculate the noise power in the main optical path according to the gain control monitoring channel power.

The unamplified signal power of the unamplified signal light in the signal light passing through the pump laser is calculated on the basis of the second signal optical power, the noise power of the signal light in the main optical path, and the actual gain to obtain the unamplified source signal power; the second offset gain is calculated on the basis of the first signal optical power and the unamplified source signal power; and the first offset slope is calculated on the basis of the second offset gain.

The source signal power $P_{inu}$ of the source signal light which is unamplified but passes through the Raman optical fiber amplifier can be obtained through formula (6):

$$P_{inu}=P_{out}-P_{ASE\_Inband}-G_{cal} \qquad (6)$$

where $P_{inu}$ represents the power of the source signal light which is unamplified but passes through the Raman optical fiber amplifier, and Goal represents an actual gain obtained by bringing the gain control monitoring channel power PASE into Formula (2) at this time.

The photodiode cannot directly detect a clean signal optical power without any noise, and thus in the embodiment of the present disclosure, the noise power $P_{ASE\_Inband}$ in the main optical path is subtracted from the directly detected signal optical power $P_{out}$, then the gain $G_{cal}$ of the signal light amplified by the optical fiber amplifier is subtracted, and then the unamplified source signal power $P_{inu}$ can be obtained.

In the embodiment of the present disclosure, when the pump laser is turned off, the signal light is emitted to the Raman optical fiber amplifier, and the signal optical power of this time detected by the first photodiode is just the first signal optical power that is not amplified, i.e. the signal optical power when the pump laser is turned off, which is regarded as the input power.

The second offset gain $G_{comp}$ is calculated by the relationship, i.e. formula (7), between the input power of the signal light and the unamplified source signal power when the pump laser is turned off.

$$G_{comp} = \frac{Pin - Pinu}{k_{ASE}2(n)} \qquad (7)$$

According to said $G_{comp}$ obtained at this time, the first offset slope $T_{comp}$ is calculated by formula (8).

$$T_{comp}=k_{comp}*G_{comp} \qquad (8)$$

The post-initial-adjustment target gain is adjusted by using the second offset gain; that is, the adjusted target gain is $G_{set}+G_{offset}+G_{comp}$, and the adjusted target slope is $T_{set}+T_{comp}$, then the adjusted target gain and target slope are brought into formula (1) to calculate the adjusted target power of this time, and the actual power of the pump laser is controlled to reach the adjusted target power, thus the entire feedback process ends, and at this time, the actual gain and the actual slope of the optical fiber amplifier are just the target gain $G_{set}$ and target slope $T_{set}$ which are initially expected by the customer.

Due to the special nature of the Raman amplification effect, it is impossible to detect the input power of the signal light and the amplified output power of the signal light at the same time like an erbium-doped fiber amplifier, and there is no way to always determine whether the fiber amplifier is stable according to the relationship between the input power, the output power and the real-time gain. Therefore, in the embodiment of the present disclosure, when the pump laser is turned off, the signal light is emitted to the Raman optical fiber amplifier, and the first photodiode detects the power of the signal light at this time, i.e. the first signal optical power, which can be regarded as the input power Pin; after the pump laser is turned on and the signal light passes through the Raman optical fiber amplifier, the first photodiode detects the power of the signal light at this time, i.e. the second signal optical power Pout, however, the second signal optical power at this time is the signal optical power with noise, it is needed to firstly subtract the noise power of signal light in the main optical path, i.e. the in-band noise power, then subtract the actual gain of the signal light, and then what is obtained is just the unamplified source signal power, which can be regarded as the output power $P_{inu}$.

It is worth mentioning that in addition to the noise in the main optical path, i.e. the in-band noise, the second signal optical power also relates to out-of-band noise, i.e., the noise in the gain control monitoring channel, but the out-of-band noise is too small relative to the in-band noise to be ignored, therefore, only the in-band noise power is subtracted from the second signal optical power Pour of the above formula.

Under normal conditions, when the signal light is emitted to the fiber amplifier, the first photodiode can measure the second signal optical power, however, when the signal light is no longer emitted to the fiber amplifier, the pump laser itself will continue to turn on because it cannot determine that the light source is turned off. The value of Ping is calculated through formula (6). When $P_{inu}=0$, it can be determined that the signal light is turned off, and at this time, it is in a light-free state, and the pump laser can be turned off; that is, $P_{inu}=0$ can also be used as a signal that it is in a light-free state and the pump laser can be turned off.

Figure 2C:
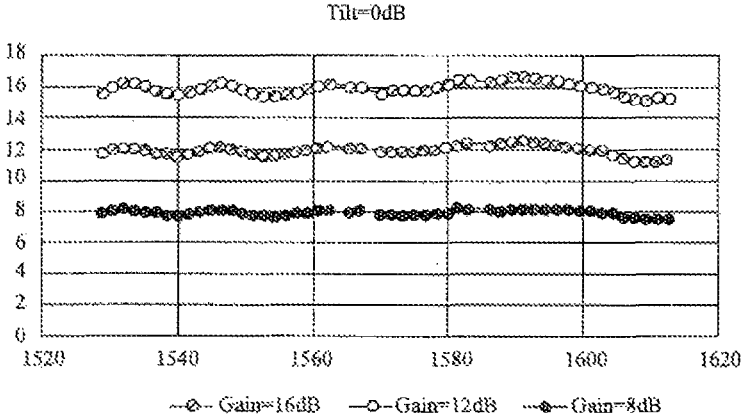

FIG. 2a-2c are schematic diagrams of C+L-band signal light after being amplified by a Raman optical fiber amplifier in an embodiment of the present disclosure. It can be seen from these diagrams that in a case of the same initial gain, when the slope is larger than 0, the gain will become larger and larger; when the slope is less than 0, the gain will become smaller and smaller; and when the slope is equal to 0, the gain is maintained in a relatively stable state.

In the control method provided by the embodiments of the present disclosure, the post-initial-adjustment target gain is obtained by adjusting the target gain with the first offset gain; then the second offset gain and the first offset slope are obtained on the basis of the computation by means of the first signal optical power of the signal light read when the pump laser is turned off and the second signal optical power read after the signal light is amplified by the pump laser; and the post-initial-adjustment target gain and target slope are adjusted by the second offset gain and the first offset slope, so that high-precision control can be provided for the gain and the slope of the optical fiber amplifier.

Figures 3, 4:
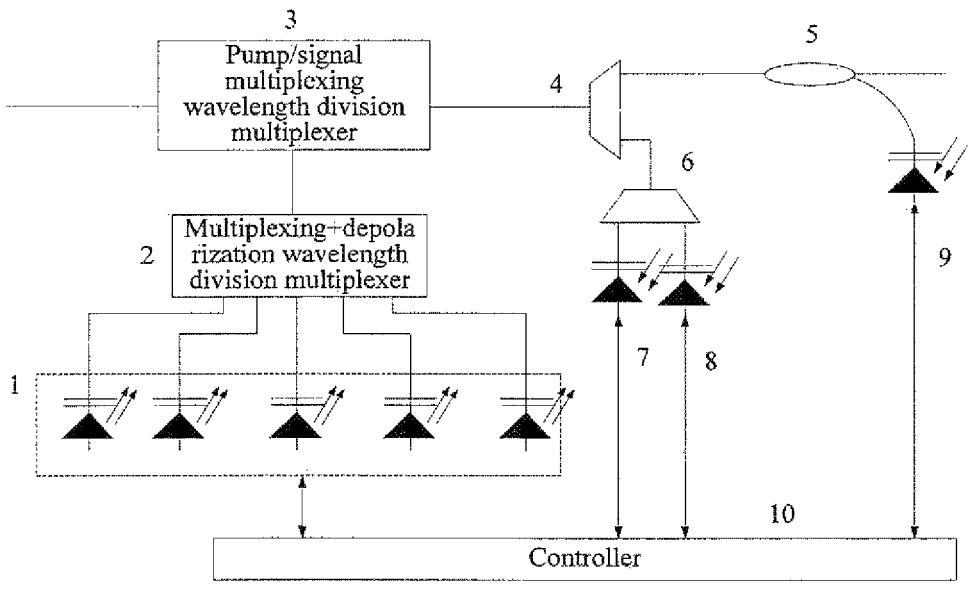
FIG. 3 is a schematic structural diagram of an optical fiber amplifier provided by an embodiment of the present disclosure.
FIG. 4 is a structural block diagram of an optical fiber amplifier provided by an embodiment of the present disclosure.

FIG. 3 shows the structure of an optical fiber amplifier. Specifically, the optical fiber amplifier comprises a pump laser set 1 composed of 5 pump lasers, a multiplexing+depolarization wavelength division multiplexer 2, a pump/signal multiplexing wavelength division multiplexer 3, and a signal light separation wavelength division multiplexer 4, a light splitting coupler 5, a gain-control-monitoring-channel separation wavelength division multiplexer 6, a second photodiode 7, a second photodiode 8, a first photodiode 9, and controller 10.

Generally, the range of the C+L band is from 1530 nm to 1610 nm, and the maximum gain frequency of the Raman amplification effect is obtained when the wavelength of the pump laser is in the band with a wavelength of about 13.2 THz; that is, the wavelength of the pump laser is generally selected between 1420 nm and 1500 nm. At least four pump lasers are provided to ensure the flatness of the gain of the optical fiber amplifier. Five pump lasers are provided in the embodiments of the present disclosure.

All of the signal light in the gain control monitoring channel is generated by the spontaneous radiation amplification of the Raman amplification effect. The wavelengths of these signal light are the wavelengths other than those of the signal light to be amplified, and the power thereof is not affected by the presence or absence of the signal light. The number of the gain control monitoring channel is related to the bandwidth of the band of the signal light, and when the bandwidth of the band of the signal light is narrow, only one gain control monitoring channel can be used. Exemplarily, considering the ultra-wide spectral range of the C+L band, the wavelength of two gain control monitoring channels are generally selected here, one being located at a short wave whose wavelength is less than the shortest wavelength of the C-band, and the other being located at a long wave whose wavelength is larger than the longest wavelength of the L-band. After the pump/signal multiplexed wave passes through the signal light separation wavelength division multiplexer 4, the signal in the gain control monitoring channel is filtered out from the main optical path, and is divided into two gain-control-monitoring channels with different wavelengths by the gain-control-monitoring-channel separation wavelength division multiplexer 6, wherein each gain control monitoring channel has a second photodiode, and there is a first photodiode on the main optical path.

As shown in FIG. 4, an optical fiber amplifier provided by an embodiment of the present disclosure includes: a controller 31, a pump laser 32, and a first photodiode 33.

The controller 31 is configured to initially adjust a target gain on the basis of a first offset gain to obtain a post-initial-adjustment target gain; to calculate a second offset gain and a first offset slope on the basis of first signal optical power and second signal optical power when actual power of the pump laser 32 reaches target power determined on the basis of the post-initial-adjustment target gain; to adjust again the post-initial-adjustment target gain according to the second offset gain to obtain a adjusted target gain; and to adjust a target slope according to the first offset slope to obtain a adjusted target slope.

The pump laser 32 is configured to adjust the actual power according to the control of the controller 31.

The first photodiode 33 is configured to detect the first optical signal power when the pump laser 32 is turned off, and the second optical signal power when the actual power of the pump laser 32 reaches the target power.

The first offset gain is a gain offset determined for different environments.

The controller 31 of the optical fiber amplifier provided by the embodiment of the present disclosure is further configured to calculate a first actual gain and a second actual gain by means of computation on the basis of a first preset slope, a first preset gain and a second preset gain; and to calculate the first offset gain on the basis of the first actual gain, the second actual gain, the first preset gain and the second preset gain.

Specifically, a first preset gain $Gain_{offset\_set1}$, a second preset gain $Gain_{offset\_set1}$, and a first preset slope Tilt are set in the controller 31 of the optical fiber amplifier provided in the embodiment of the present disclosure in advance. At this time, let Tilt=0.

The first target power of the pump laser 32 is calculated by a feedforward formula (1) on the basis of the first preset gain $Gain_{offset\_set1}$ and the first preset slope Tilt. After the first target power of the pump laser 32 is calculated, the controller 31 of the optical fiber amplifier controls the current of these pump laser 32, so that the first actual power of the pump laser 32 reaches the first target power, that is, the first actual power of each pump laser 32 is equal to the first target power. At this time, the gain control monitoring channel power $P_{ASE(1)}$ is read through the photodiode of either gain control monitoring channel in above two gain control monitoring channels, and is brought into formula (2), and then the first actual gain $G_{offset(1)}$ is calculated under the premise of the power of the read gain control monitoring channel read here.

On the basis of the second preset gain $Gain_{offset\_set2}$ and the first preset slope Tilt, the second target power of the pump laser 32 is calculated by the feedforward formula (1).

After the second target power of the pump laser 32 is calculated, the controller 31 of the optical fiber amplifier controls the current of the pump laser 32, so that the second actual power of the pump lasers 32 reaches the second target power, that is, the second actual power of each pump laser 32 is equal to the second target power.

When the second actual power of each pump laser 32 reaches the second target power, the gain control monitoring channel power $P_{ASE(2)}$ is read through the photodiode of any gain control monitoring channel, and is brought into formula (2), and then the second actual gain $G_{offset(2)}$ is calculated at this time.

The first offset gain $G_{offset}$ is calculated with formula (3). At the same time, the actual slope Tilt of the optical fiber amplifier can be calculated by formula (4) according to $P_{ASE(1)}$ and $P_{ASE(2)}$ having been read twice.

The target gain $G_{set}$ that the customer needs to reach is adjusted by using the first offset gain $G_{offset}$, so that the post-initial-adjustment target gain is $G_{set}+G_{offset}$.

The controller 31 of the fiber amplifier provided by the embodiment of the present disclosure is further configured to calculate the target power of the pump laser 32 on the basis of the post-initial-adjustment target gain and the target slope.

By bringing the post-initial-adjustment target gain $G_{set}+G_{offset}$ and the target slope $T_{set}$ that the customer needs to reach into formula (1), the target power of each pump laser 32 is calculated. At this time, the controller 31 of the fiber amplifier controls the current of the pump laser 32, so that the actual power of the pump laser 32 reaches the target power, that is, the actual power of each pump laser 32 is equal to the target power.

Formula (1) can be used as the feedforward formula of the embodiments of the present disclosure, and the target gain and the target slope are brought into Formula (1) to calculate the target power of each pump laser 32 which is a theoretical value and can be understood as that when the actual power of each pump laser 32 reaches this target power, the actual gain and the actual slope should be the same as the target gain and the target slope; however, due to the error caused by similar environmental reasons, after the actual power of each pump laser 32 is controlled to reach the target power, the obtained actual gain and slope obtained are different from the target gain and the target slope, but they are very close. Therefore, the function of formula (1) is to let the operator know to which value the power of each pump laser 32 should be adjusted to make the gain at this time be closer to the target gain, which simplifies the process that the operator gradually and tentatively adjusts the power of the pump laser 32 to reach the target gain and the target slope and has a fast and efficient effect.

The optical fiber amplifier provided by the embodiments of the present disclosure further includes a second photodiode 34 configured to detect the power of the gain control monitoring channel; and the controller 31 is further configured to receive the gain control monitoring channel power detected by the second photodiode 34, and to calculate the noise power of the optical signal in the main optical path based on the gain control monitoring channel power; and to calculate an actual gain based on the gain control monitoring channel power.

When the actual power of the pump laser is equal to the target power, the gain control monitoring channel power $P_{ASE}$ is detected through the second photodiode on any gain control monitoring channel and is brought into Formula (2), then the actual gain $G_{cal}$ at this time is calculated.

The noise power $P_{ASE\_Inband}$ of the signal light in the main optical path is calculated by bring it into formula (5).

Due to the spontaneous radiation amplification of the Raman amplification effect, after the signal light is amplified by the Raman fiber amplifier, a noise signal will be generated in the main optical path, namely $P_{ASE\_Inband}$, and Formula (5) can calculate the noise power in the main optical path according to the power of the gain control monitoring channel.

The unamplified signal power of the unamplified signal light in the signal light passing through the pump laser 32 is calculated on the basis of the second signal optical power, the noise power of the signal light in the main optical path, and the actual gain to obtain the unamplified source signal power; the second offset gain is calculated on the basis of the first signal optical power and the unamplified source signal power; and the first offset slope is calculated on the basis of the second offset gain.

The unamplified source signal power $P_{inu}$ of the unamplified source signal light passing through the Raman optical fiber amplifier can be obtained through Formula (6).

The photodiode cannot directly detect a clean signal optical power Pow without any noise, therefore, in the embodiment of the present disclosure, the noise power $P_{ASE\_Inband}$ in the main optical path is subtracted from the directly detected signal optical power, and then the gain Goal of the signal light amplified by the optical fiber amplifier is subtracted, thus the unamplified source signal power $P_{inu}$ can be obtained.

In the embodiment of the present disclosure, when the pump laser 32 is turned off, the signal light is emitted to the Raman optical fiber amplifier, and the signal light power detected by the first photodiode 33 at this time is just the first signal optical power of the unamplified signal light, i.e. the signal optical power when the pump laser 32 is turned off, which is taken as the input power.

The second offset gain $G_{comp}$ is calculated by the relationship, i.e. formula (7), between the input power of the signal light when the pump laser 32 is turned off and the unamplified source signal power. According to said $G_{comp}$ obtained at this time, the first offset slope $T_{comp}$ is calculated by means of formula (8).

The post-initial-adjustment target gain is adjusted by using the second offset gain; that is, the adjusted target gain is $G_{set}+G_{offset}+G_{comp}$, and the adjusted target slope is $T_{set}+$ $T_{comp}$. The adjusted target power at this time is calculated by bringing the adjusted target gain and target slope into formula (1), and the actual power of the pump laser 32 is controlled to reach the adjusted target power. Thus, the entire feedback process ends. At this time, the actual gain and the actual slope of the optical fiber amplifier are just the target gain $G_{set}$ and target slope $T_{set}$ initially expected by the customer.

Due to the special nature of the Raman optical fiber amplification effect, it is impossible to detect, at the same time, the input power of the signal light when being not amplified and the output power of the signal light when being amplified like an erbium-doped fiber amplifier, and there is no way to always detect whether the fiber amplifier is stable according to the relationship between the input power, the output power and the real-time gain. Therefore, in the embodiment of the present disclosure, when the pump laser 32 is turned off, the signal light is emitted to the Raman optical fiber amplifier, and the first photodiode 33 detects the signal light power at this time, i.e. the first signal optical power, which can be regarded as the input power Pin; when the pump laser 32 is turned on, after the signal light passes through the Raman optical fiber amplifier, the first photodiode 33 detects the signal light power at this time, i.e. the second signal optical power Pout, however, the second signal optical power at this time is the signal optical power with noise, in this case, it is needed to firstly subtract the noise signal optical power in the main optical path, i.e. the in-band noise power from it, and then subtract the actual gain of the signal light, then what is obtained is just the unamplified source signal power, which can be regarded as the output power $P_{inu}$.

It is worth mentioning that in addition to the in-band noise in the main optical path, the second signal optical power also has out-of-band noise, namely, the noise in gain control monitoring channel. But since the out-of-band noise is very small relative to the in-band noise, it can be ignored. Therefore, only the in-band noise power is subtracted from the second signal optical power $P_{out}$ of the above formula.

Under normal conditions, when the signal light is emitted to the fiber amplifier, the first photodiode 33 can detect the second signal optical power, however, when the signal light is no longer emitted to the fiber amplifier, the pump laser 32 per se will continue to turn on because it cannot determine that the light source has been turned off. The value of $P_{inu}$ is calculated through formula (6). When $P_{inu}=0$, it can be determined that the signal light is turned off, at this time, it is in a light-free state, and the pump laser can be turned off; that is, $P_{inu}=0$ can also be used as a signal that it is in a light-free state and the pump laser can be turned off.

In the optical fiber amplifier provided by the embodiment of the present disclosure, the controller 31 thereof adjusts the target gain on the basis of the first offset gain to obtain the post-initial-adjustment target gain; then the second offset gain and the first offset slope are calculated on the basis of the first signal optical power of the signal light which is read when the pump laser 32 is turned off and the second optical power of the signal light which is read when the signal light is amplified by the pump laser 32; and the post-initial-adjustment target gain and target slope are adjusted by using the second offset gain and the first offset slope, so that high-precision control can be provided for the gain and the slope of the optical fiber amplifier.

The above description is only specific embodiments of the present disclosure, however, the protection scope of the present disclosure is not limited to it. Any person skilled in the art can easily think of changes or substitutions within the technical scope as disclosed by the present disclosure, and which should be included within the protection scope of the present disclosure. Therefore, the protection scope of the present disclosure should be subject to the protection scope of the present disclosure.

What is claimed is:

1. A control method for controlling a gain and slope of an optical fiber amplifier in an ultra-wideband C+L-band system, comprising:

initially adjusting a target gain of the optical fiber amplifier on the basis of a first offset gain to obtain a post-initial-adjustment target gain;

calculating a second offset gain and a first offset slope of the optical fiber amplifier on the basis of first signal optical power and second signal optical power when actual power of a pump laser reaches target power determined on the basis of the post-initial-adjustment target gain, wherein the second signal optical power is signal optical power when the actual power of the pump laser reaches the target power, and the first signal optical power is signal optical power when the pump laser is turned off;

adjusting again the post-initial-adjustment target gain according to the second offset gain to obtain a adjusted target gain; and adjusting a target slope according to the first offset slope to obtain a adjusted target slope.

2. The method of claim 1, wherein the method further comprises:

obtaining a first actual gain and a second actual gain by means of computation on the basis of a first preset slope, a first preset gain, and a second preset gain;

calculating the first offset gain on the basis of the first actual gain, the second actual gain, the first preset gain and the second preset gain.

3. The method of claim 1, wherein the method further comprises:

calculating the target power of the pump laser on the basis of the post-initial-adjustment target gain and the target slope.

4. The method of claim 1, wherein before calculating the second offset gain and the first offset slope on the basis of the first signal optical power and the second signal optical power, the method further comprises:

obtaining gain control monitoring channel power;

calculating noise power of signal light in a main optical path based on the gain control monitoring channel power; and calculating an actual gain based on the gain control monitoring channel power.

5. The method of claim 4, wherein calculating the second offset gain and the first offset slope on the basis of the first signal optical power and the second signal optical power comprises:

calculating signal optical power of the signal light passing through the pump laser when it is not amplified, on the basis of the second signal optical power, the noise power of signal light in the main optical path, and the actual gain, to obtain unamplified source signal power;

calculating the second offset gain on the basis of the first signal optical power and the unamplified source signal power;

calculating the first offset slope on the basis of the second offset gain.

6. An optical fiber amplifier in an ultra-wideband C+L-band system comprising:

a controller, a pump laser, and a first photodiode; wherein the controller is configured to initially adjust a target gain on the basis of a first offset gain to obtain a post-initial-adjustment target gain; to calculate a second offset gain and a first offset slope on the basis of first signal optical power and second signal optical power when actual power of the pump laser reaches target power determined on the basis of the post-initial-adjustment target gain; to adjust again the post-initial-adjustment target gain according to the second offset gain to obtain a adjusted target gain; and to adjust a target slope according to the first offset slope to obtain a adjusted target slope;

the pump laser is configured to adjust the actual power according to control of the controller; and the first photodiode is configured to detect the first optical signal power when the pump laser is turned off, and the second optical signal power when the actual power of the pump laser reaches the target power.

7. The optical fiber amplifier of claim 6, wherein the controller is further configured to calculate a first actual gain and a second actual gain by means of computation on the basis of a first preset slope, a first preset gain, and a second preset gain; and to calculate the first offset gain on the basis of the first actual gain, the second actual gain, the first preset gain and the second preset gain.

8. The optical fiber amplifier of claim 6, wherein the controller is further configured to calculate the target power of the pump laser on the basis of the post-initial-adjustment target gain and the target slope.

9. The optical fiber amplifier of claim 6, wherein the optical fiber amplifier further comprises:

a second photodiode, which is configured to detect gain control monitoring channel power; and the controller is further configured to receive the gain control monitoring channel power detected by the second photodiode, to calculate noise power of signal light in a main optical path based on the gain control monitoring channel power; and to calculate an actual gain based on the gain control monitoring channel power.

10. The optical fiber amplifier of claim 9, wherein the controller is further configured to calculate signal optical power of the signal light passing through the pump laser when it is not amplified, on the basis of the second signal optical power, the noise power of signal light in the main optical path, and the actual gain, to obtain unamplified source signal power; to calculate the second offset gain on the basis of the first signal optical power and the unamplified source signal power; and to calculate the first offset slope on the basis of the second offset gain.

11. The method of claim 1, further comprising:

based on a first preset gain, a first preset slope, and a second preset gain, obtaining first target power and second target power of each pump laser by means of a feedforward formula:

$$P(n)*PL = k1(n)*G^2 + k2(n)*G_i + k3(n)*T^2 + k4(n)*T + b \qquad (1),$$

where G represents a preset gain of the optical fiber amplifier; T represents the first preset slope of the optical fiber amplifier; n is a positive integer; $P(n)$ represents the first target power of the nth pump laser; $k1(n), k2(n), k3(n)$, and b are the calibration parameters of each pump laser, which are values pre-written into a memory of each pump laser;

after first actual power or second actual power of each pump laser reach the first or second target power respectively, acquiring gain control monitoring channel power of corresponding gain control monitoring channel, and then obtaining a first and second actual gains by means of a following formula:

$$P_{ASE} = k_{ASE}1 * G^2 + k_{ASE}2 * G + k_{ASE}3 * T^2 + k_{ASE}4 * T + b_{ASE} \qquad (2),$$

where parameters $k_{ASE}1$, $k_{ASE}2$, $k_{ASE}3$, $k_{ASE}4$, $b_{ASE}$ are obtained through calibration and are written into the memory when each pump laser leaves a factory, and at this time for T, it is still Tilt=0; and obtaining the first offset gain by means of a following formula:

$$G_{offset} = \frac{G_{offset(1)} - G_{offset(2)}}{\text{Gain}_{offset\_set1} - \text{Gain}_{offset\_set2}} * \text{Gain}_{offset\_set1} + \qquad (3)$$

$$\frac{G_{offset(1)} * \text{Gain}_{offset\_set2} - G_{offset(2)} * \text{Gain}_{offset\_set3}}{\text{Gain}_{offset\_set2} - \text{Gain}_{offset\_set1}}$$

where $G_{offset}$ represents the first offset gain; $G_{offset(1)}$ represents the first actual gain; $G_{offset(2)}$ represents the second actual gain; $\text{Gain}_{offset\_set1}$ represents the first preset gain; $\text{Gain}_{offset\_set2}$ represents the second preset gain.

* * * * *